US010278327B2

(12) United States Patent
Skinner et al.

(10) Patent No.: US 10,278,327 B2
(45) Date of Patent: May 7, 2019

(54) TRIMMER HEAD FOR USE WITH LINE AND BLADES

(71) Applicant: Shakespeare Company, LLC, Boca Raton, FL (US)

(72) Inventors: David B Skinner, Columbia, SC (US); James A Bennett, Westport, CT (US)

(73) Assignee: Shakespeare Company, LLC, Boca Raton, FL (US)

( * ) Notice: Subject to any disclaimer, the term of this patent is extended or adjusted under 35 U.S.C. 154(b) by 201 days.

(21) Appl. No.: 14/707,884

(22) Filed: May 8, 2015

(65) Prior Publication Data
US 2016/0324067 A1   Nov. 10, 2016

(51) Int. Cl.
*A01D 34/416* (2006.01)
*A01D 34/73* (2006.01)

(52) U.S. Cl.
CPC ....... *A01D 34/733* (2013.01); *A01D 34/4166* (2013.01)

(58) Field of Classification Search
CPC .............. A01D 34/412; A01D 34/416; A01D 34/4161; A01D 34/4162; A01D 34/4163; A01D 34/4165; A01D 34/4166; A01D 34/4167; A01D 34/42; A01D 34/44
USPC .......................................................... 30/276
See application file for complete search history.

(56) References Cited

U.S. PATENT DOCUMENTS

| 4,361,570 | A |   | 11/1982 | Fici |
| D299,484  | S | * | 1/1989  | Lee ................................... D8/8 |
| 4,796,415 | A |   | 1/1989  | Moore |
| D301,110  | S | * | 5/1989  | Barbula ............................. D8/7 |
| 4,856,194 | A |   | 8/1989  | Lee |
| 4,905,465 | A |   | 3/1990  | Jones et al. |
| 4,962,630 | A |   | 10/1990 | Jones |
| 5,048,278 | A | * | 9/1991  | Jones ................... A01D 34/4166 30/276 |
| 5,430,943 | A |   | 7/1995  | Lee |
| 5,577,374 | A |   | 11/1996 | Huston |
| 5,617,636 | A | * | 4/1997  | Taggett ................ A01D 34/736 30/276 |
| 5,772,172 | A |   | 3/1998  | Walden |
| 5,791,054 | A | * | 8/1998  | Bessinger .......... A01D 34/4166 30/276 |
| 5,852,876 | A |   | 12/1998 | Wang |
| 5,862,598 | A | * | 1/1999  | Lee .................... A01D 34/4168 30/276 |
| 5,862,655 | A |   | 1/1999  | Altamirano et al. |
| 6,038,842 | A |   | 3/2000  | Quiroga |

(Continued)

FOREIGN PATENT DOCUMENTS

CA   2589026   6/2006

*Primary Examiner* — Jason Daniel Prone
*Assistant Examiner* — Richard Crosby, Jr.
(74) *Attorney, Agent, or Firm* — Eversheds Sutherland (US) LLP

(57) ABSTRACT

A trimmer head for a rotary cutting device that utilizes a plurality of trimmer line and cutting blades either separately or simultaneously, the blades pivotally connected to the trimmer head in a first plane which is generally parallel to and underneath a second plane in which the trimmer line is pivotally connected to the trimmer head, each of the blades and strips of trimmer line capable of pivoting within a lateral arc of at least 180 degrees within its respective plane without striking the trimmer head or any other blades or trimmer line.

18 Claims, 25 Drawing Sheets

(56) References Cited

U.S. PATENT DOCUMENTS

| | | | |
|---|---|---|---|
| 6,052,907 A * | 4/2000 | Wang | A01D 34/416 |
| | | | 30/276 |
| 6,112,416 A | 9/2000 | Bridges et al. | |
| 6,122,832 A | 9/2000 | Lee | |
| 6,427,341 B1 | 6/2002 | Lee | |
| D496,840 S | 10/2004 | Iacona | |
| 6,817,102 B2 * | 11/2004 | Harris | A01D 34/736 |
| | | | 30/276 |
| 6,827,152 B2 | 12/2004 | Iacona | |
| 6,912,789 B2 * | 7/2005 | Price, III | A01D 34/733 |
| | | | 30/276 |
| D532,263 S | 11/2006 | Iacona | |
| 7,412,768 B2 | 8/2008 | Alliss | |
| 7,536,792 B2 * | 5/2009 | Moore | A01D 34/4166 |
| | | | 30/276 |
| 7,603,782 B2 | 10/2009 | Jerez | |
| 7,743,511 B1 | 6/2010 | Jerez | |
| 7,913,401 B2 * | 3/2011 | Iacona | A01D 34/4168 |
| | | | 30/275.4 |
| 8,069,758 B2 | 12/2011 | Zhang | |
| 8,186,135 B2 | 5/2012 | Leonardi et al. | |
| 8,307,559 B2 | 11/2012 | Tomita | |
| 8,464,431 B2 * | 6/2013 | Reynolds | A01D 34/4163 |
| | | | 30/276 |
| 8,769,831 B2 | 7/2014 | Duvall | |
| 8,973,274 B2 * | 3/2015 | Proulx | A01D 34/4166 |
| | | | 30/122 |
| 9,079,394 B2 | 7/2015 | Harless | |
| 9,363,946 B2 * | 6/2016 | Pellenc | A01D 34/416 |
| 2002/0073556 A1 | 6/2002 | Fogle | |
| 2007/0084061 A1 * | 4/2007 | Bennett | A01D 34/416 |
| | | | 30/276 |
| 2009/0038163 A1 | 2/2009 | Jerez et al. | |
| 2010/0083506 A1 * | 4/2010 | Bennett | A01D 34/4168 |
| | | | 30/122 |
| 2013/0152359 A1 | 6/2013 | Jerez | |
| 2014/0202009 A1 | 7/2014 | Proulx | |
| 2015/0107118 A1 * | 4/2015 | Banjo | A01D 34/4168 |
| | | | 30/276 |
| 2015/0216122 A1 * | 8/2015 | Jerez | A01D 34/4165 |
| | | | 30/276 |
| 2015/0245558 A1 * | 9/2015 | Morabit | A01D 34/4165 |
| | | | 30/276 |

* cited by examiner

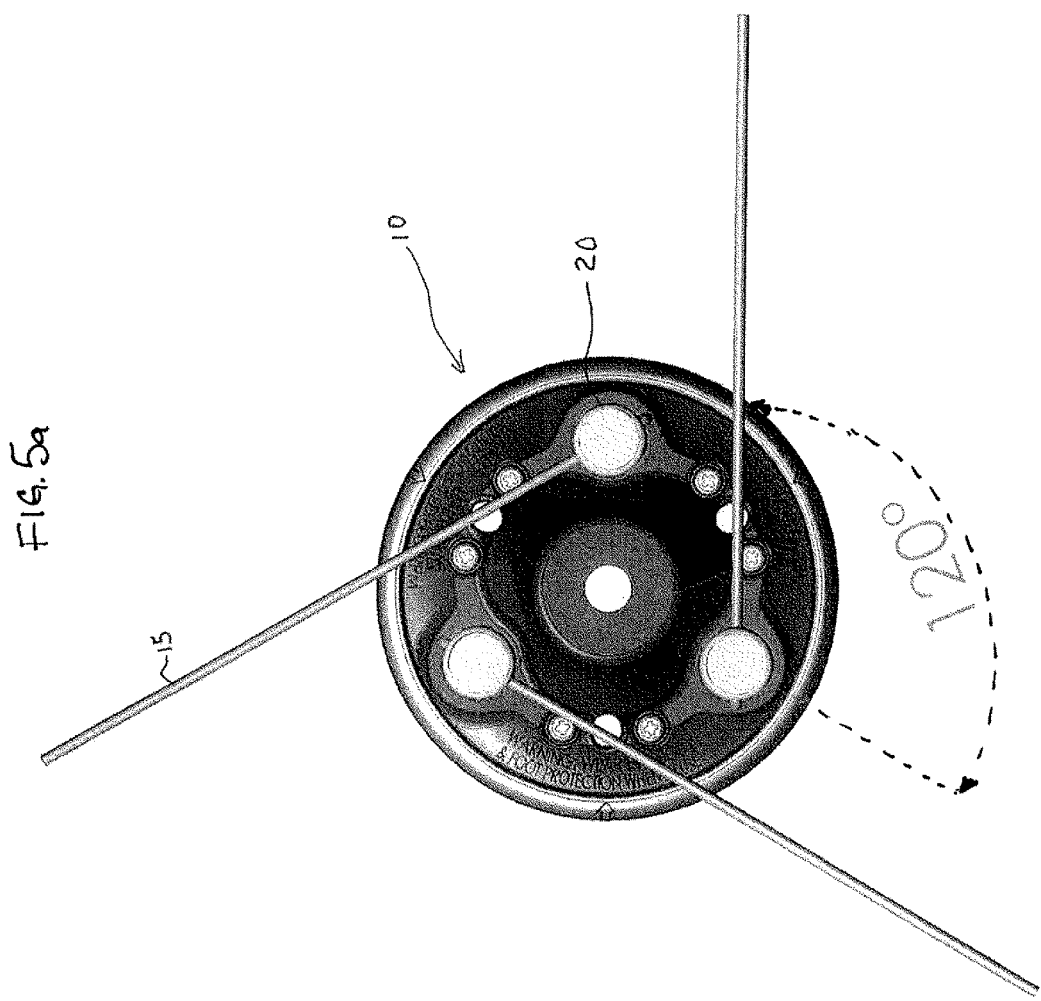

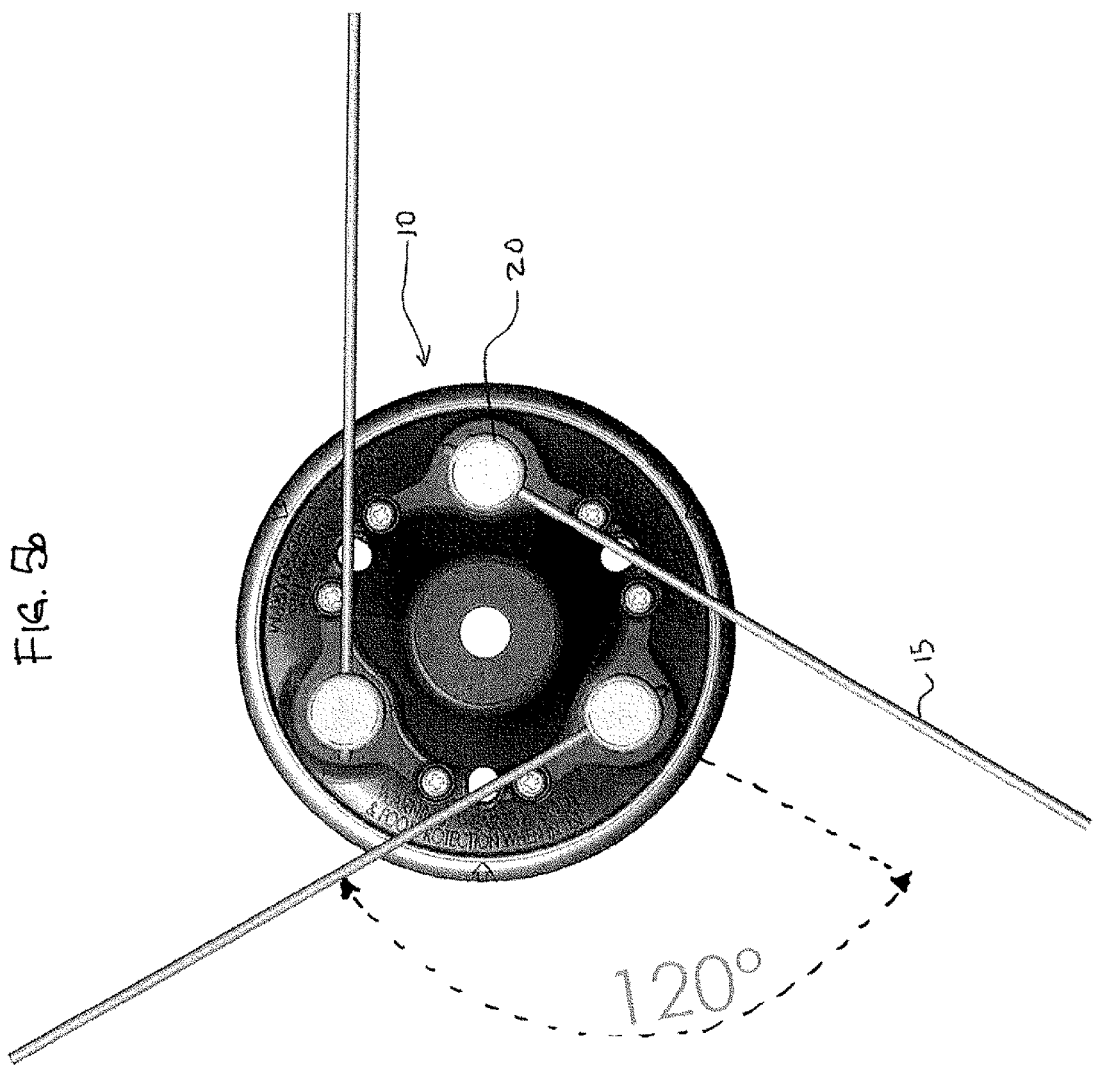

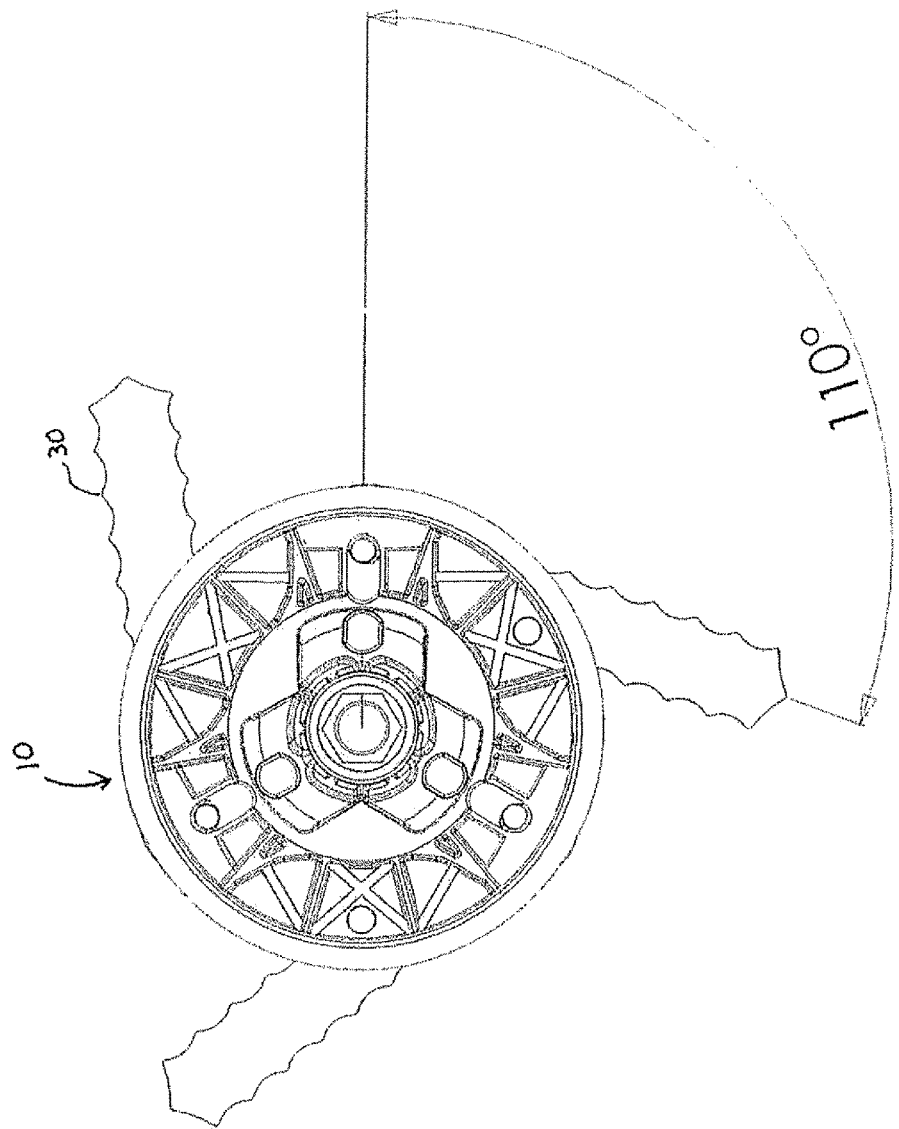

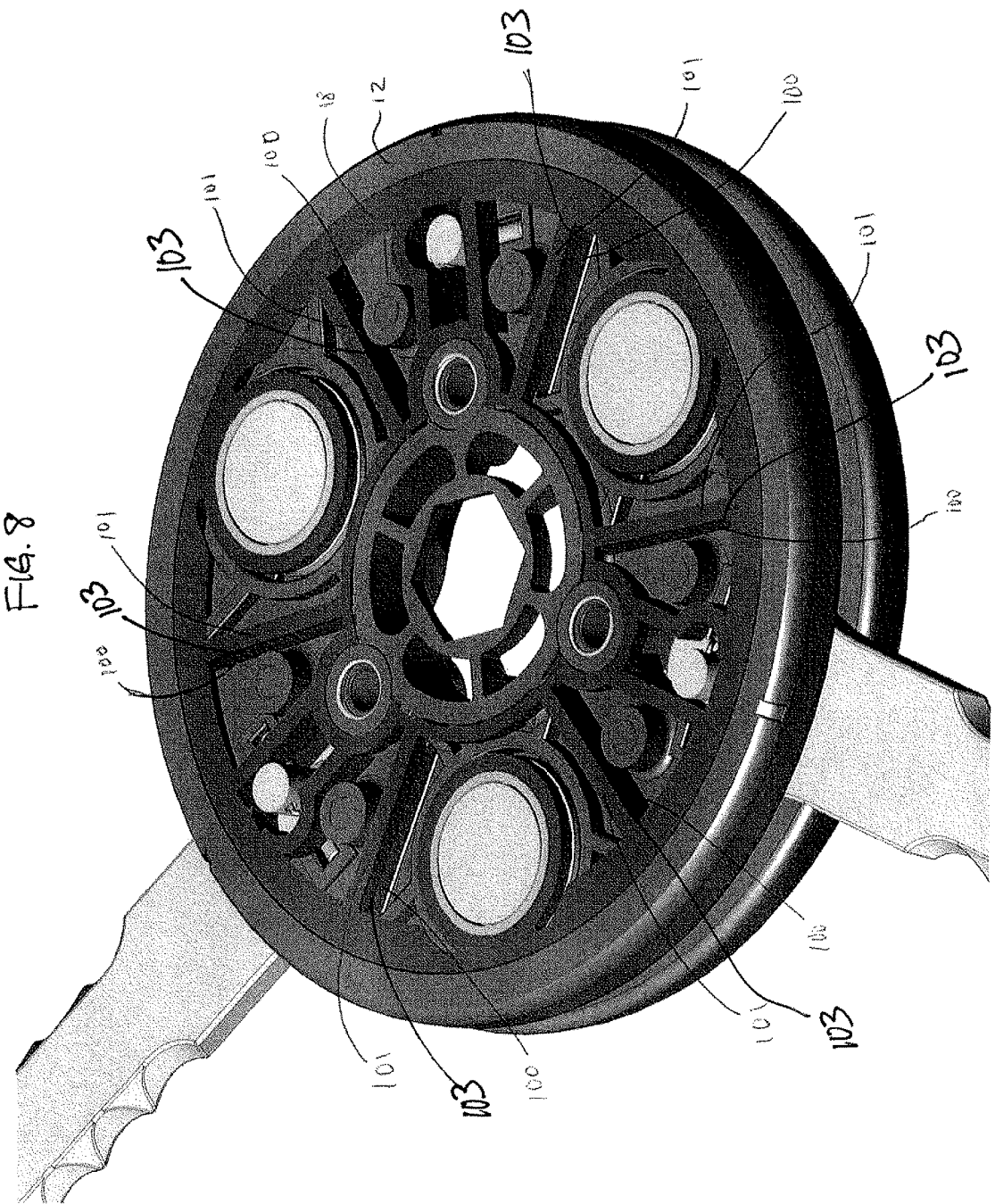

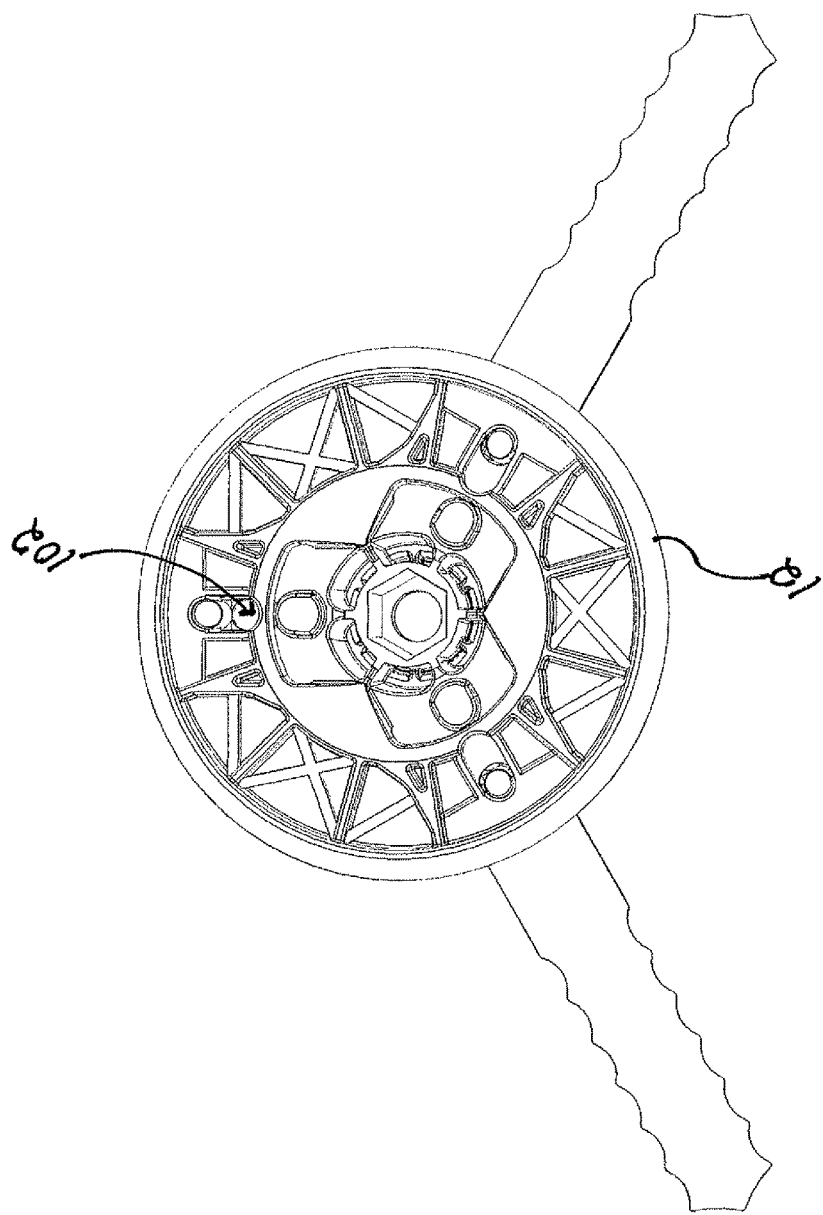

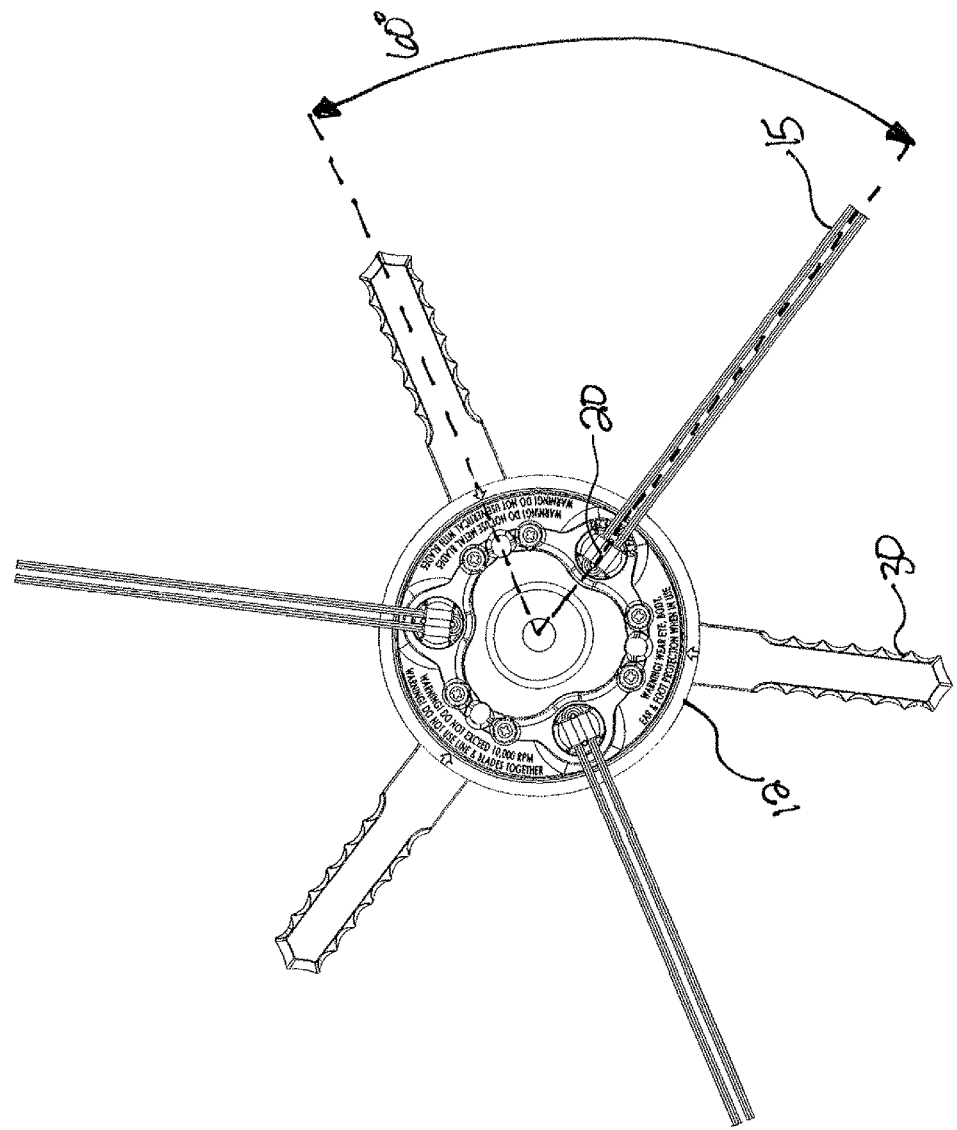

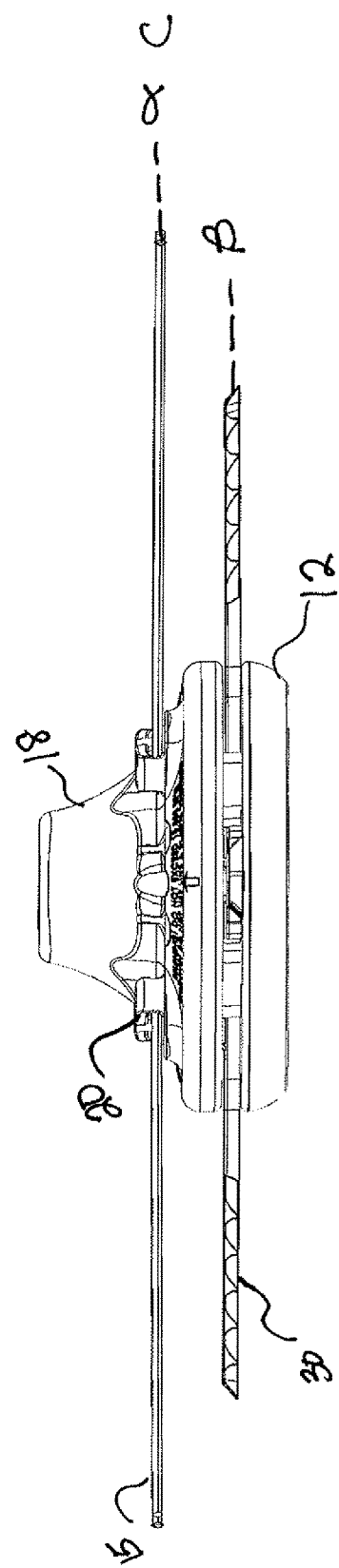

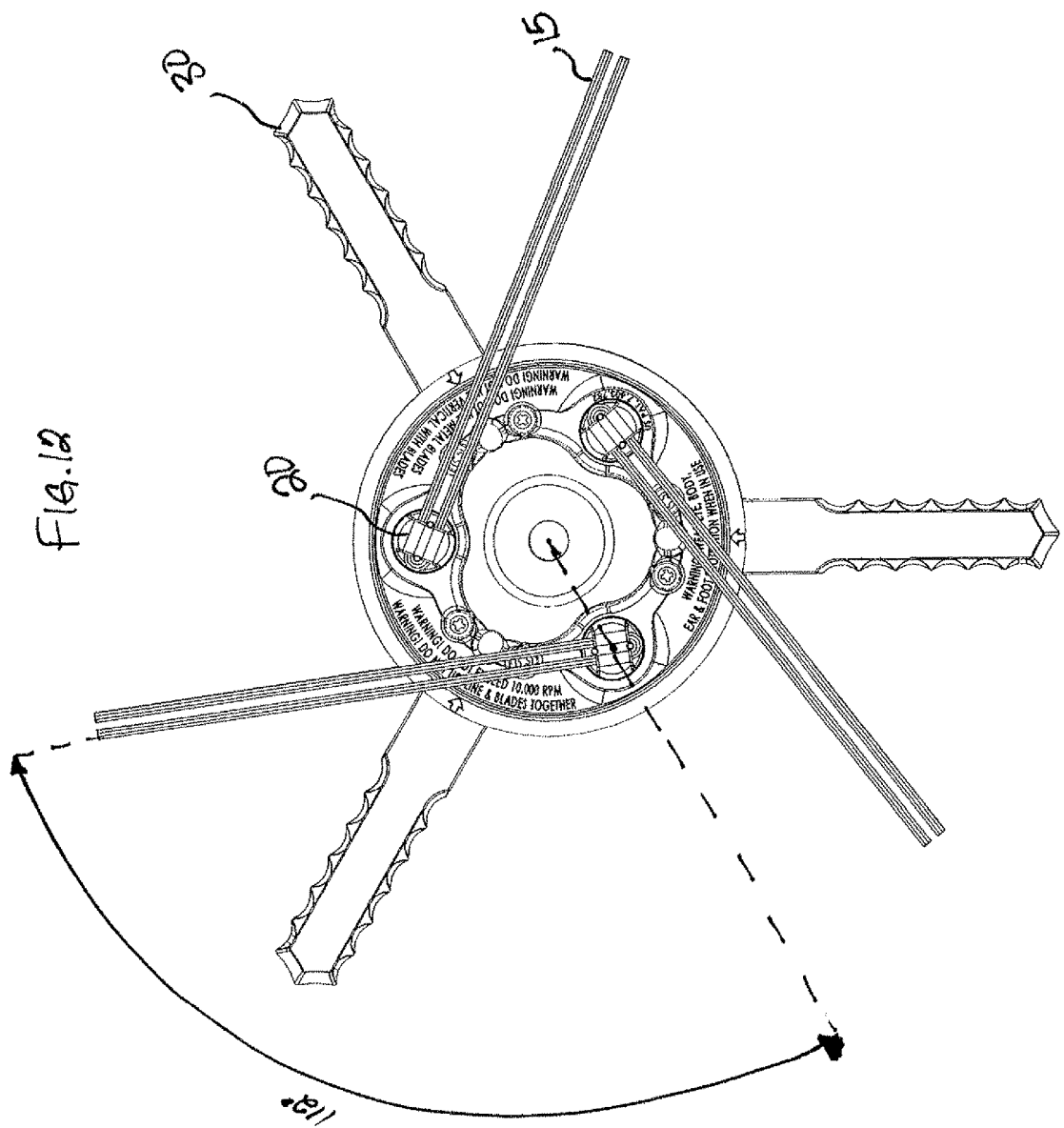

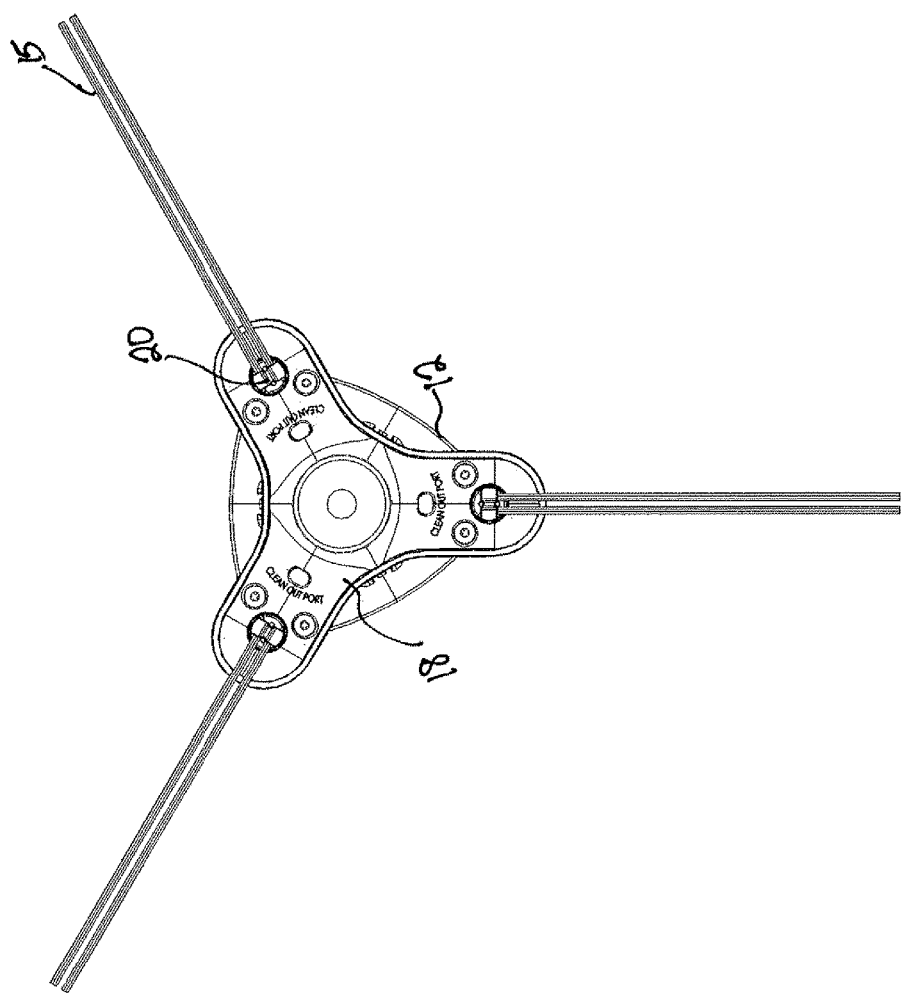

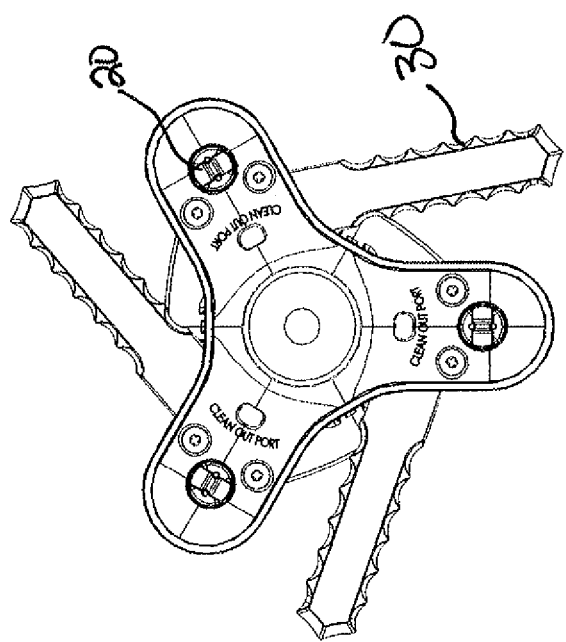

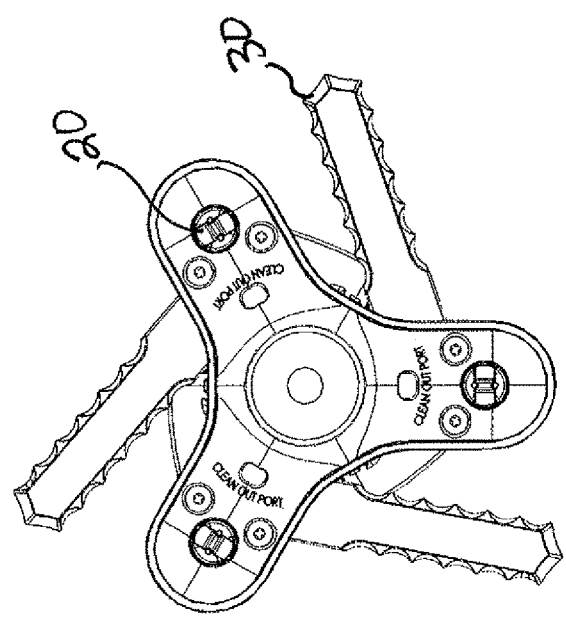

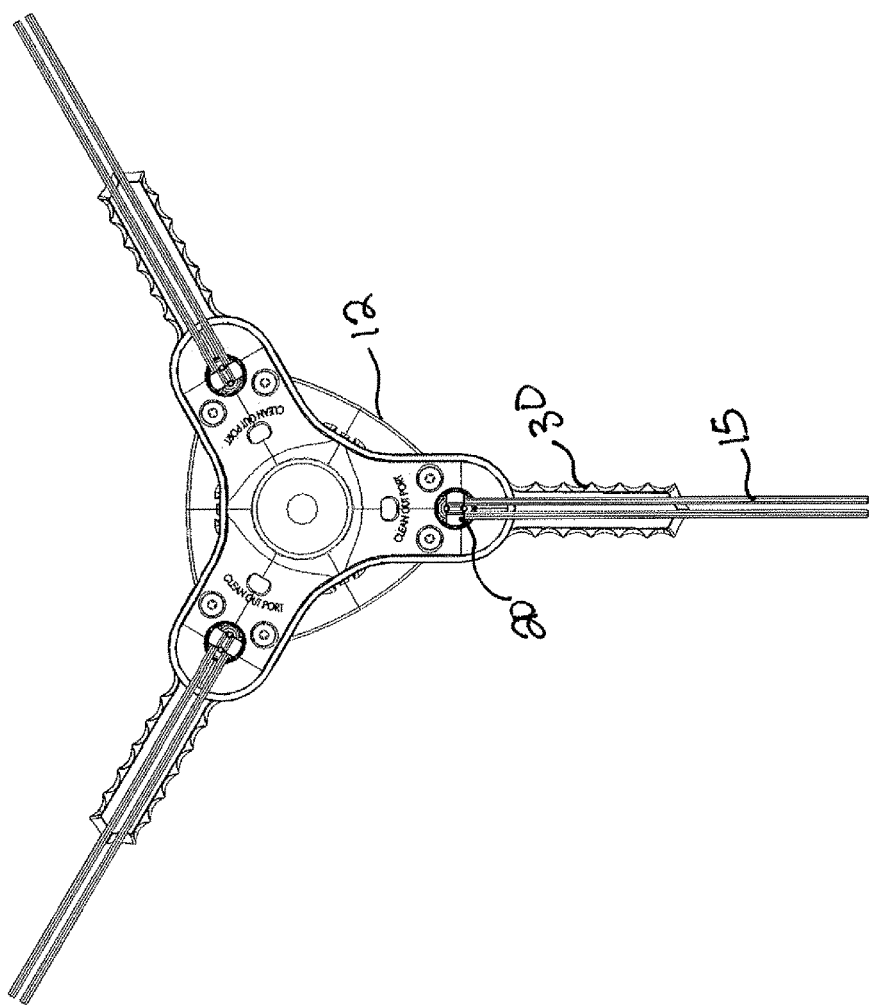

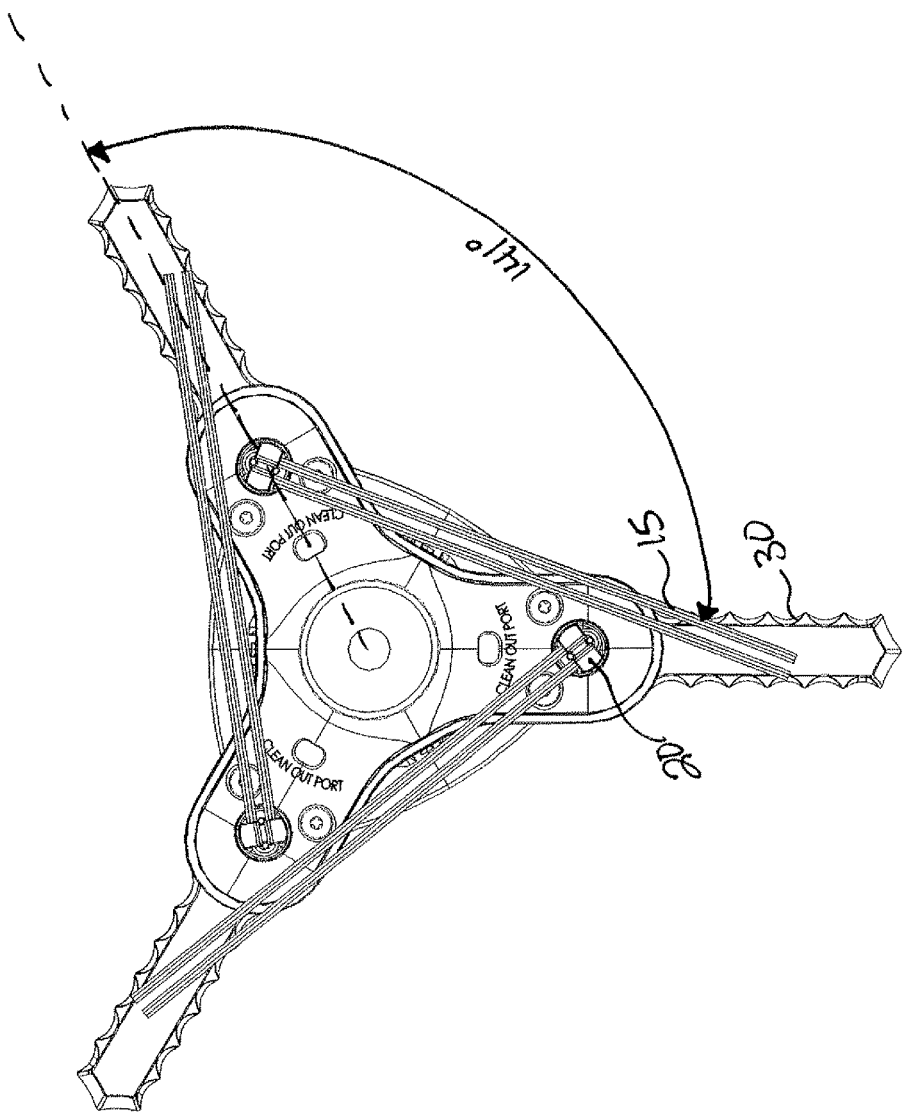

TRIMMER HEAD FOR USE WITH LINE AND BLADES

CROSS-REFERENCE TO RELATED APPLICATIONS

This application claims priority to U.S. Provisional Patent Application No. 61/990,769 filed May 9, 2014, which is incorporated by reference as if fully rewritten herein.

FIELD OF INVENTION

The present invention generally relates to a head section for a rotary cutting device as a means for cutting vegetation. More specifically, it relates to a trimmer head having particular mechanisms for facilitating the installation, retention and removal of cutting blades therefrom, in combination with pivoting trimmer line holders capable of holding folded strips of monofilament trimmer line. The line and line holders are capable of pivoting within a lateral arc at least 180 degrees before the line would strike another portion of the head section. The blade holding mechanisms allow the blades to pivot in an are at least 180 degrees before the blades would strike another portion of the head section. The trimmer head allows for both blades and line to be used separately or simultaneously in a single trimmer head. When both cutting elements are used simultaneously, the head is configured to allow the user to be selective in which cutting element is utilized without stopping the operation of the trimmer. This invention also relates to portions of the head section designed to allow easy removal of debris from the blade holding portions of the head section, and other features designed to keep debris from reaching and interfering with the pivoting line holders.

BACKGROUND OF THE INVENTION

There are many alternate names commonly used for a weed trimmer device, including but not limited to: weed trimmer, brush cutter, string trimmer, string trimmer machine, trimmer device, weed trimmer machine, weed-whacker, rotary cutting device and strimmer machine. The string trimmer device is coupled with a power source which supplies rotary power for spinning a head section or trimmer head. The trimmer device is traditionally configured to allow the user to place the trimmer head near the ground. The trimmer head is configured to hold trimmer line or cutting blades for the purpose of impacting and cutting vegetation.

As is known in the art, some head sections (trimmer heads) for rotary cutting devices employ pivotally mounted blades that extend outwardly from the head section such that, when the head section is rotated, the blades are also rotated to cut vegetation or other items as necessary. Other head sections employ strips of line which also extend outwardly from the head section such that, when the head section is rotated, the strips of monofilament line are forced in an outward radial direction to cut vegetation. Blades and monofilament line are the two most common types of cutting elements used with weed trimmer machines.

The trimmer line is capable of cutting grass and lighter vegetation. Blades are needed for vegetation with larger stalks and for cutting tree saplings. Blades are not the best choice for trimming lawn grasses or for conducting typical trimming tasks around decorative borders used at many residential homes. A monofilament line is a better choice for those situations. However, there are occasions when the residential user could benefit from having a heavier duty blade available for cutting denser and larger vegetation. As such, a trimmer head which can accommodate both blades and trimmer line is beneficial, preferably a trimmer head that can utilize either cutting blades or trimmer line without the need for changing the head section.

One of the drawbacks from prior attempts to combine trimmer line and cutting blades into a single trimmer head is that the line holding mechanisms and blade holding mechanisms which secure the cutting elements to the trimmer head require space within the trimmer head. Because of this space requirement, the two types of mechanisms tend to interfere with the movement of the actual cutting element held by the adjacent mechanism. Prior to this invention, a trimmer head configured with both pivotally mounted blades and pivoting line holders has not been available. Most significantly, the blade and line heads available prior to this invention did not allow both types of cutting elements to be utilized at the same time where both types of cutting elements could each pivot more than 90 degrees in one direction prior to striking a portion of the trimmer head or the adjacent mechanism holding the adjacent cutting element.

There are many alternate names commonly used for the monofilament line used for cutting vegetation including but not limited to: trimmer line, weed trimmer line, grass trimmer line, monofilament line, string trimmer line, strimmer line, cutting line, line, line strips, strips, flails, and weed whacker line. Monofilament line is sold in many different cross-sectional shapes and is made from many different types of nylon plastic. Some of the nylon plastics are more easily deformed than others and some materials have lower melting points than others.

There are also many alternate names commonly used for the pivoting line holders including but not limited to: posts, pivoting line holders, pivoting posts, pivot posts, line holding mechanisms and pivoting line holding mechanisms. All of these terms may be used interchangeably. These terms are used with line holders that are designed to pivot about a vertical axis. Some of these terms, however, are also used with line holders that are not designed to pivot.

SUMMARY OF THE INVENTION

The current proposed invention provides a head section for a rotary cutting device that utilizes trimmer line and cutting blades either separately or simultaneously. The blade holding mechanism is described fully in U.S. Pat. No. 8,069,758, which is hereby included in its entirety by reference. The present invention also provides a method for holding a folded strip of trimmer line in a post that can pivot. In one embodiment, the line holding mechanism can pivot and hold a folded strip of trimmer line. One means of holding a folded strip of line in a pivoting line holder is set forth in U.S. Pat. Nos. 7,603,782 and 7,743,511, both hereby included in their entireties by reference. In other embodiments, the line holding mechanism can hold folded strips of trimmer line using alternate means, including methods for holding folded strips of trimmer line and methods for holding single strips of trimmer line.

The present invention includes in the same trimmer head, one or more blade holding mechanisms capable of allowing the blades to freely pivot more than 180 degrees in a lateral direction in a first plane, and one or more pivot posts capable of holding a folded or a single strip of monofilament trimmer line which is capable of allowing the trimmer line to freely pivot more than 180 degrees in a lateral arc in a second plane which is generally parallel to and located above the first plane.

Certain embodiments of the present invention include three blade holding mechanisms which are spaced equally apart and three line holding mechanisms which are spaced equally apart. In certain embodiments, the blade holding mechanisms are aligned with the line holding mechanism.

The invention includes chambers for the blade holding mechanisms and the line holding mechanisms which are sealed from one another to minimize the passage of debris into the portions of the head holding the pivoting line holding mechanism. The invention also includes a passageway through the portion of the head holding the blade holding mechanism. This passageway allows the user a means to push debris from the trimmer head.

BRIEF DESCRIPTION OF THE FIGURES

FIG. 3b shows a side view of the line holding mechanism shown in FIG. 3a.

FIG. 3c shows a perspective view of a cross section of the line holding mechanism shown in FIG. 3a.

FIG. 5a shows a top view of the head section of the trimmer head shown in FIG. 1 with three strips of monofilament line rotated fully in one direction.

FIG. 5b shows a top view of the head section shown in FIG. 5a, with the three strips of monofilament line rotated fully in the opposite direction as shown in FIG. 5a.

FIG. 6a shows a bottom view of the head section shown in FIG. 1, with three blades rotated fully in one direction.

FIG. 8 shows an upper perspective view of a cross-sectional slice of the trimmer head shown in FIG. 1, depicting the mating of the top cover shown in FIG. 7a and the main housing shown in FIG. 7b, with two blades extending outward.

FIG. 9 shows a bottom view of the trimmer had of FIG. 1, shown with one blade removed for visibility of the passageway used for cleaning out debris from the portion of the head that houses the blade holding mechanism.

FIG. 11a shows a top view of the trimmer head of FIG. 1 having three blades and three strips of trimmer line installed.

FIG. 11b shows a side view of the trimmer head shown in FIG. 11a showing planes α and β.

FIG. 12 shows a top view of the trimmer head of FIG. 11 shown with the three strips of trimmer line fully rotated in one direction.

FIG. 14 shows a top view of the trimmer head of FIG. 13 with three strips of trimmer line installed.

FIG. 15 shows a top view of the trimmer head of FIG. 13 with the three strips of trimmer line rotated fully in one direction.

FIG. 18 shows a top view of the trimmer head of FIG. 13 with the three blades rotated fully in one direction.

FIG. 19 shows a top view of the trimmer head of FIG. 13 with the three blades rotated fully in the opposite direction as shown in FIG. 18

FIG. 20 shows a top view of the trimmer head of FIG. 13 having three blades and three strips of trimmer line installed.

FIG. 21 shows a top view of the trimmer head of FIG. 20 shown with the three strips of trimmer line fully rotated in one direction.

DETAILED DESCRIPTION OF THE INVENTION

Figure 1:
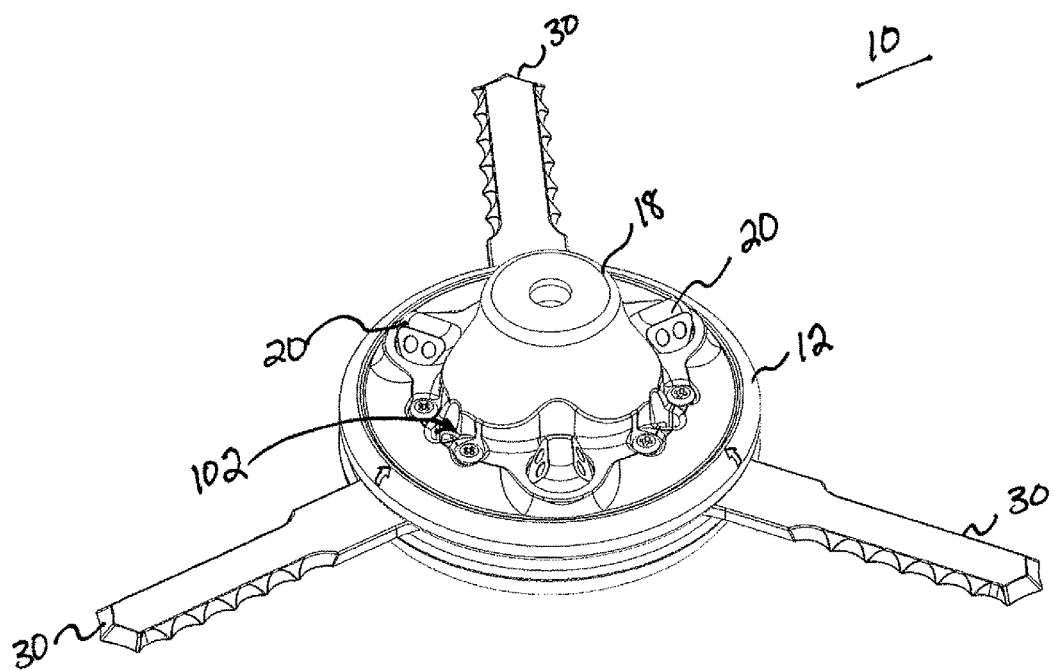
FIG. 1 shows a perspective view of a trimmer head of a first embodiment of the present invention.

FIGS. 1-12 show a first embodiment of the invention. FIGS. 11 and 12 show a top view of the trimmer head 10 having three (3) nylon blades 30 installed and three (3) strips of monofilament trimmer line 15 installed. Trimmer head 10 includes body portion 12 and cover 18 which are connected to form the body of the trimmer head. Trimmer head 10 includes axial bore 16 to enable attachment to a drive shaft of a rotary cutting device as is known in the industry. Trimmer head 10 further includes blade holding mechanisms 31 and line holding mechanisms 20 for securing the blades 30 and the trimmer lines 15, respectively, to the trimmer head.

Figure 2:
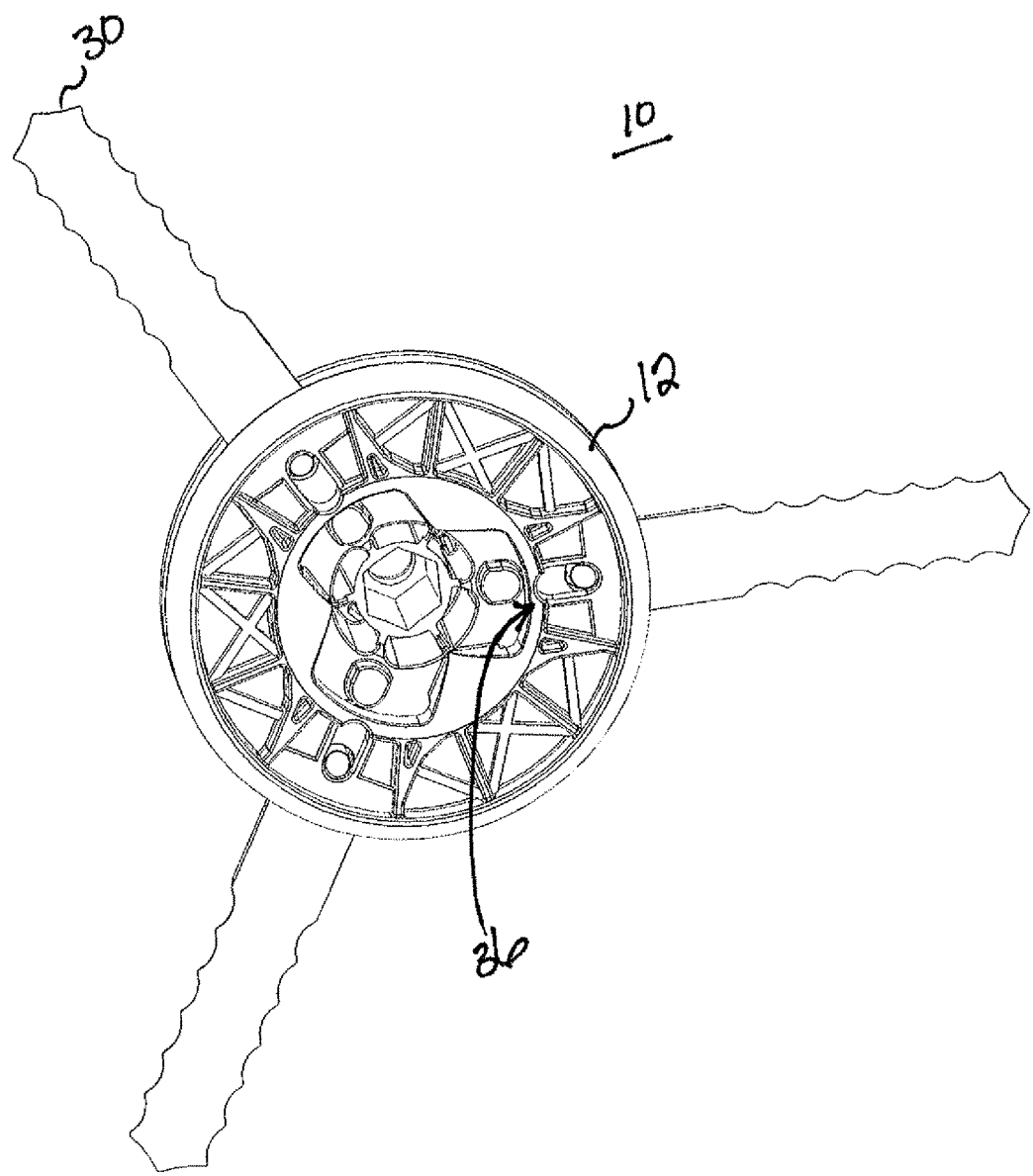
FIG. 2 shows a bottom perspective view of the trimmer head shown in FIG. 1.
Figure 3A:
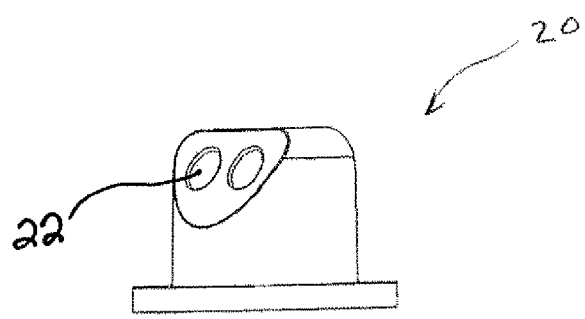
FIG. 3a shows a side perspective view of a line holding mechanism used with the trimmer head shown in FIG. 1.
Figure 3B:
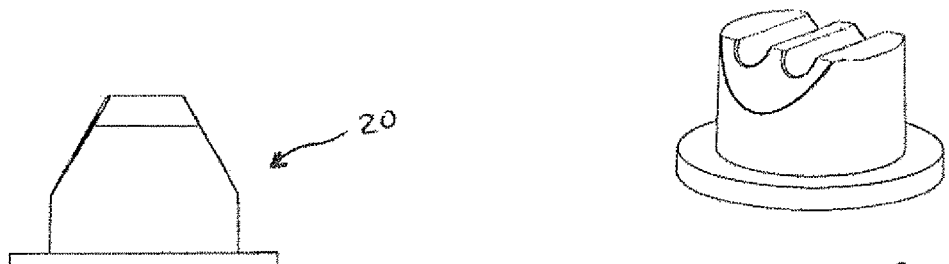
Figure 3C:
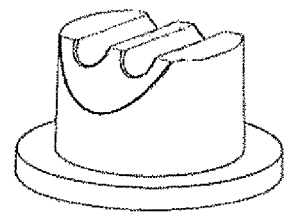
Figure 4:
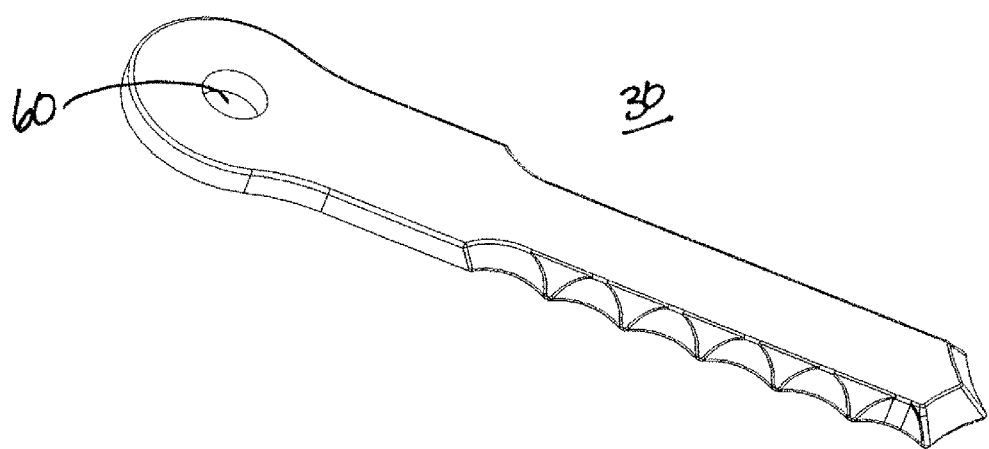
FIG. 4 shows a perspective view of a blade used with the trimmer head shown in FIG. 1.
Figure 10:
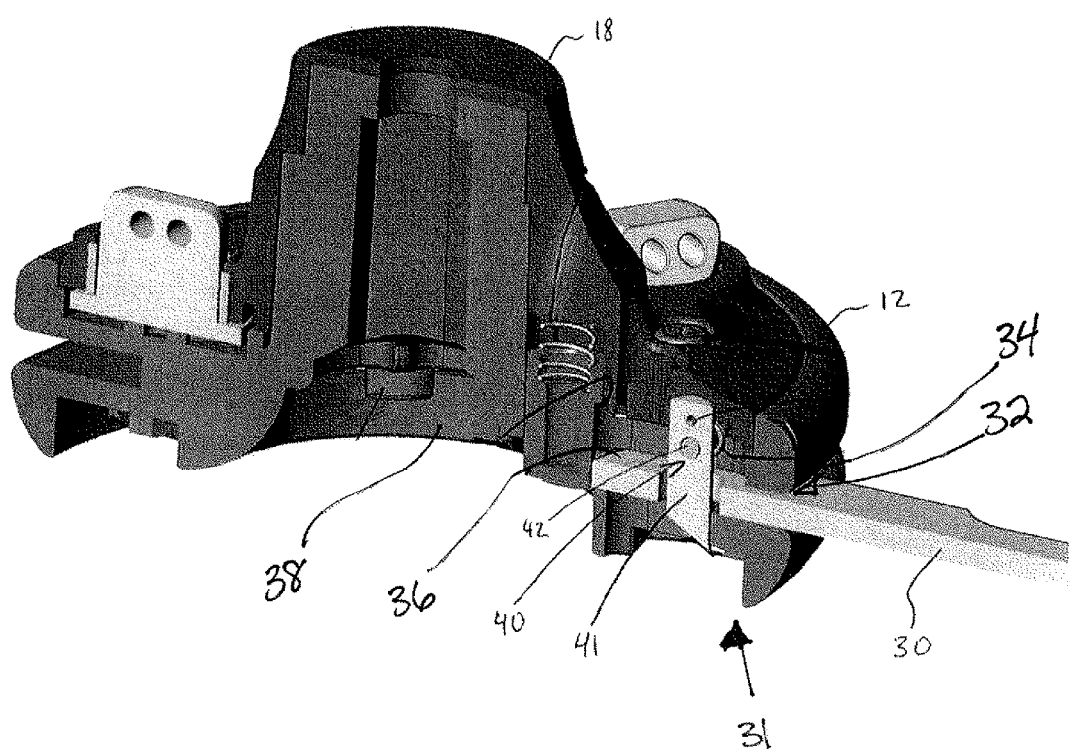
FIG. 10 shows a cross-sectional view of the trimmer head of FIG. 1, providing a detailed interior view of the blade holding mechanism.
Figure 13:
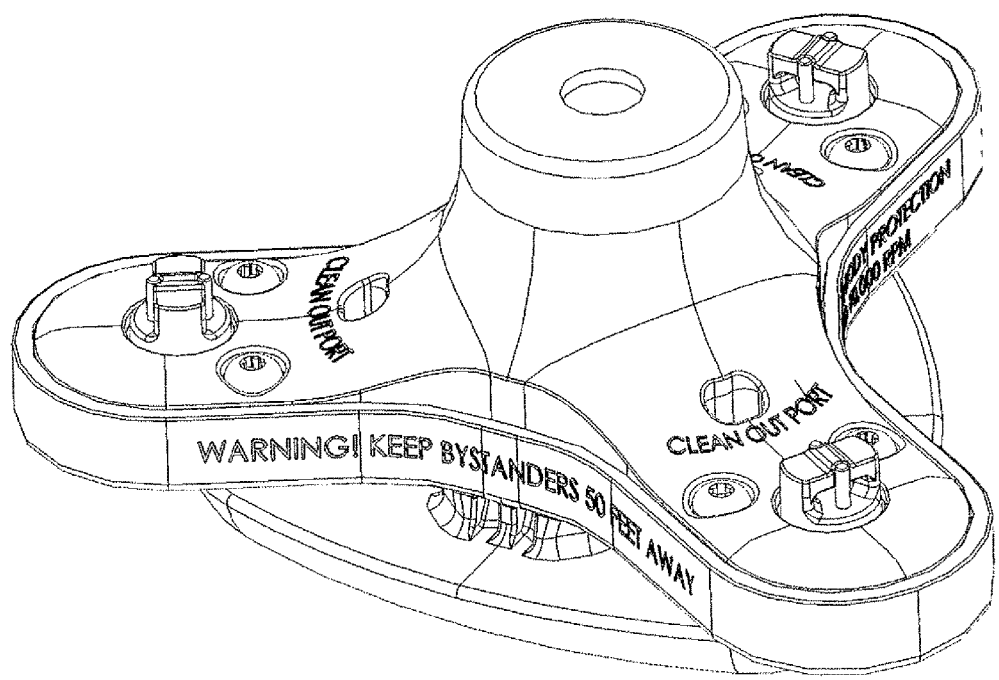
FIG. 13 shows a perspective view of a trimmer bead of a second embodiment of the present invention.
Figure 25:
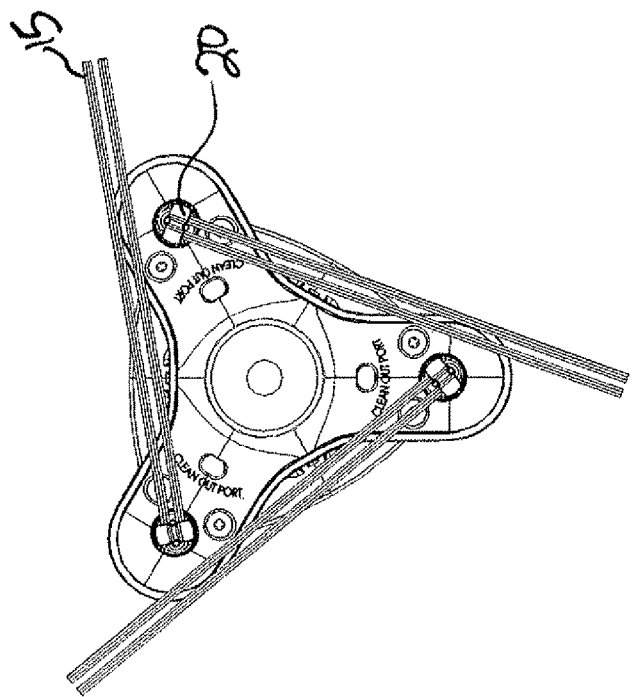
Figure 16:
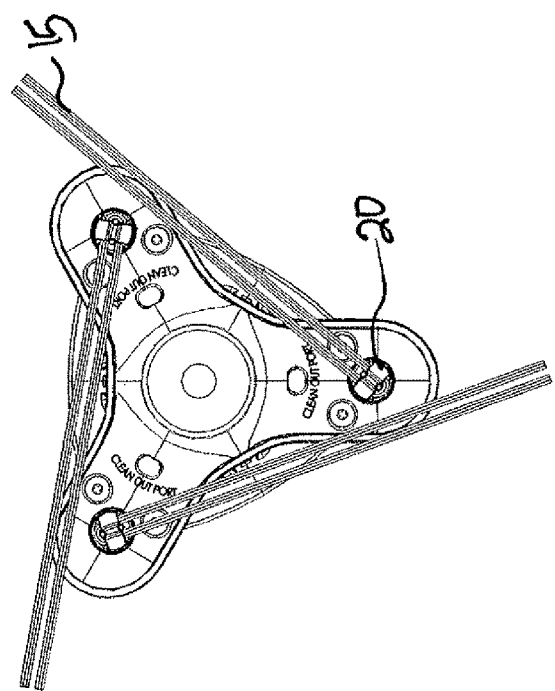
FIG. 16 shows a top view of the trimmer head of FIG. 13 with the three strips of trimmer line rotated fully in the opposite direction as shown in FIG. 15.
Figure 17:
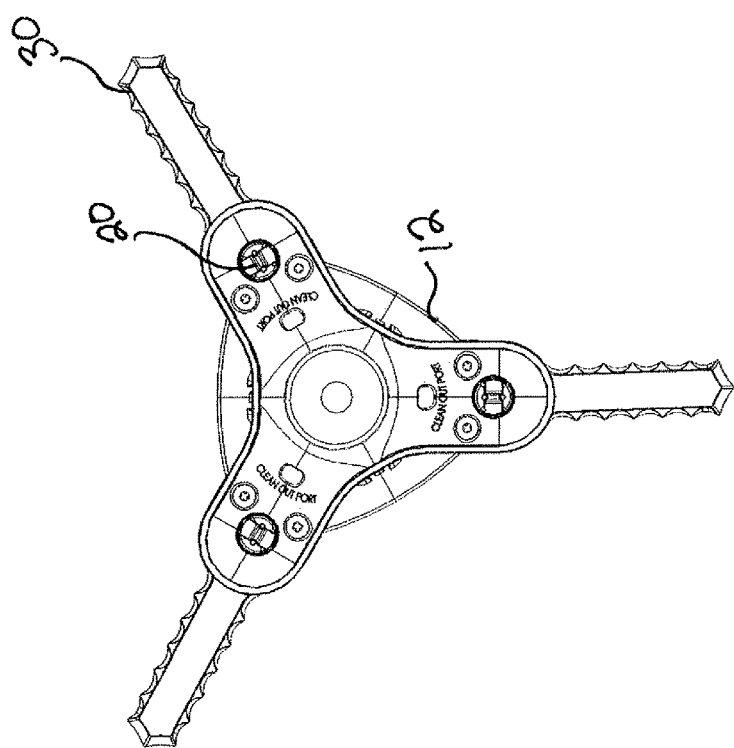
FIG. 17 shows a top view of the trimmer head of FIG. 13 with three cutting blades installed.

Looking at just the blades 30, FIGS. 1 and 2 show upper and lower perspective views, respectively, of the trimmer head 10 having three nylon blades 30 installed. FIG. 4 shows a typical blade used with this type of trimmer head. As shown in FIG. 10, trimmer head 10 includes a body portion 12 that includes one or more blade passageways 32 defined between blade entrance openings 34 located at the periphery of body portion 12, to blade exit openings 36 located at central cavity 38 in body portion 12. Each blade has a fastening mechanism 40 positioned in a respective blade passageway 32, the fastening mechanism 40 including a blade engaging member 41. The blade engaging member 41 is biased by a biasing mechanism to extend across the blade passage 32 at a blade install position. The blade engaging member 41 is movable against the bias to clear the blade passage 32. A blade 30 having a mount aperture 60 (see FIG. 4) proximate an insertion end thereof is secured to the body portion when the mount aperture occupies the blade mount position and the blade engaging member 41 extends through the mount aperture 60. Once installed, the blade is capable of lateral (pivoting) movement in either direction (e.g. clockwise or counterclockwise). The blade holding mechanism is described fully by U.S. Pat. No. 8,069,758, which is hereby include in its entirety by reference. The structure of the invention is configured to allow the blades 30 to pivot laterally more than 90 degrees in either direction relative to the outward radial position passing through the blade mount aperture 60. During use, the rotation of the trimmer head 10 by a trimmer machine causes the blades 30 to extend radially outward as shown in FIG. 1. The blades 30 pivot laterally about blade fastening mechanism 40.

Figure 6B:
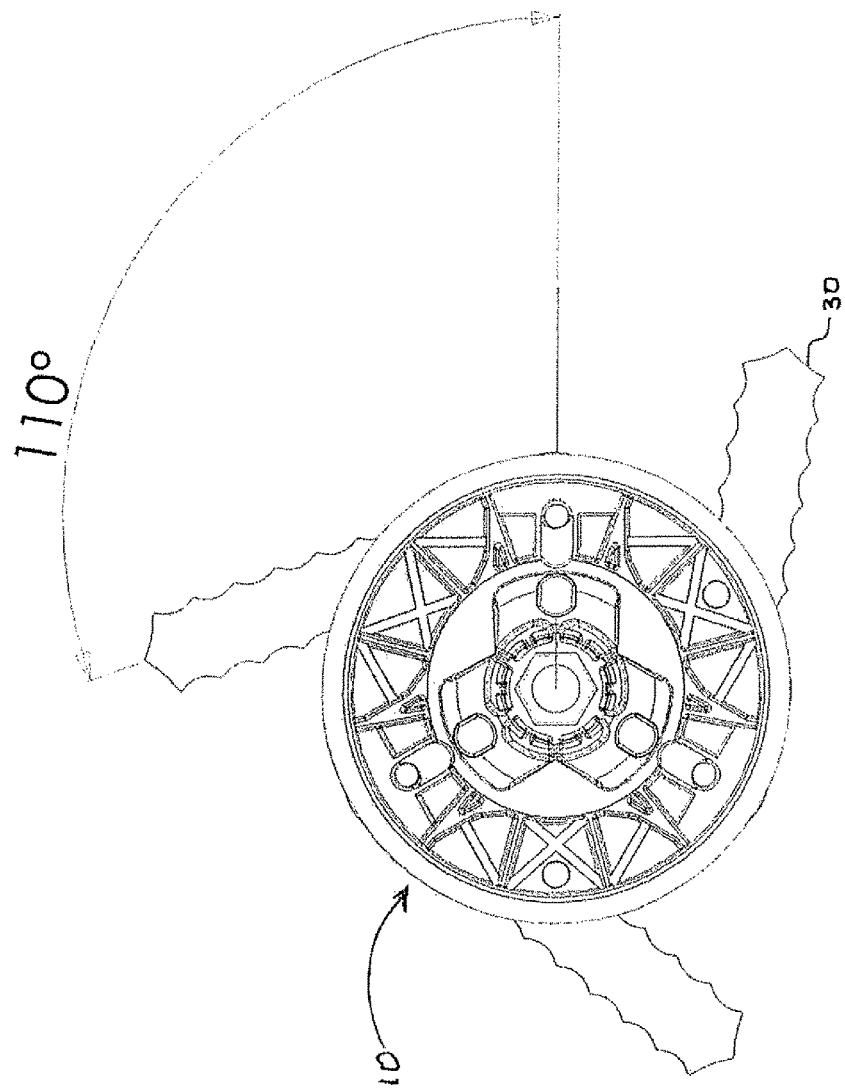
FIG. 6b shows a bottom view of the head section shown in FIG. 6a, with the three blades rotated fully in the opposite direction as shown in FIG. 6b.

If the trimmer head 10 with blades 30 is rotated at high speeds (typically between 5,000 and 10,000 revolutions per minute), the blades can pivot away from an impact with an immovable object such as a post or large rock. When viewed from below, if the trimmer head 10 with blades 30 is rotating in a counterclockwise direction, upon impact with an immovable object, the blades can pivot clockwise up to approximately one hundred and ten (110) degrees relative to the outward radial position as shown in FIG. 6*a*. Similarly, if the trimmer head 10 with blades 30 is rotating in a clockwise direction, the blades can pivot counterclockwise up to approximately one hundred and ten (110) degrees relative to the outward radial position when impacting an immovable object, as shown in FIG. 6*b*. This pivoting action of the blades 30 up to approximately 110 degrees in either direction at least minimizes and may eliminate breakage of the blades 30.

Monofilament trimmer line can also experience breakage when it encounters an immovable object or very dense vegetation. To minimize breakage, pivoting line holding mechanisms have been used to hold a folded strip of trimmer line and secure it in a rotating manner to the trimmer head. FIGS. 5*a* and 5*b* depict a trimmer head 10 viewed from above with trimmer line 15 installed in the pivot posts 20 each of which can pivot approximately 120 degrees in either direction before striking a portion of the trimmer head 10.

In a first embodiment of the present invention, trimmer head 10 incorporates three (3) blade holding mechanisms (reference numeral 31 generally, combined reference numerals 31-42) and three (3) line holding mechanisms 20 into the same trimmer head in such a way that the movement of one type of cutting element (e.g. either blade or line) does not interfere with the movement of the other type of cutting element, as shown in FIGS. 11 and 12. The line holding mechanisms 20 are positioned and operate in a plane a just above the plane 13 in which the blade 30 pivots (see FIG. 11*b*). This allows both mechanisms (the blade holding mechanism 31 and the line holding mechanism 20) to function such that the respective cutting element can freely pivot more than 90 degrees in either direction without striking the other cutting element, the holding mechanism or the trimmer head.

Ideally, cutting blades 30 should be able to pivot more than 180 degrees (more than 90 degrees clockwise or counterclockwise relative to the radial outward position) without the blades striking an adjacent line holding mechanism. Ideally, the blades would be able to pivot more than 100 degrees in either direction, and more preferably the blades should be able to pivot approximately 110 degrees in either direction. Likewise, the mechanism holding the line should be able to pivot freely in both directions so that the line can move from the outward radial position to at least 90 degrees in either direction (clockwise or counterclockwise) without the line striking the adjacent blade holding mechanism. Ideally, the trimmer line would be able to pivot more than 100 degrees in either direction, and more preferably it should be able to pivot at least approximately 120 degrees in either direction.

As shown best in FIG. 11*b*, the distance from a centerline C aligned with the through holes 22 in the line holding mechanism 20 to the plane β in which the blades 30 pivot is less than two (2) inches. Preferably, this distance is less than one (1) inch and ideally the distance is about one half (0.5") to three fourths of an inch (0.75").

Conventional sizes of trimmer heads are usable with the present invention. The overall diameter of the trimmer head 10 is preferably less than six (6) inches and ideally less than four (4) inches when measured without the blades. The overall height of the trimmer head 10 is preferably less than 2.25 inches. The centerline C of the through holes 22 in the line holding mechanisms 20 are preferably less than 1.25 inches from the bottom surface 13 of the head. This small diameter coupled with the close proximity of the line holding mechanisms and blade holding mechanism can create some detriments. The blade holding mechanism 31 is rather open to debris. Vegetation and debris tends to flow from the lower central cavity of the head and out the passageway 32 in which blade 30 is held. The debris can also collect in the head between the cover 18 and the body portion 12. The collection of debris eventually interferes with the pivoting action of the line holding mechanisms 20. The present invention addresses these problems by adding ribs 100, 101 and a passageway 102.

Figure 7A:
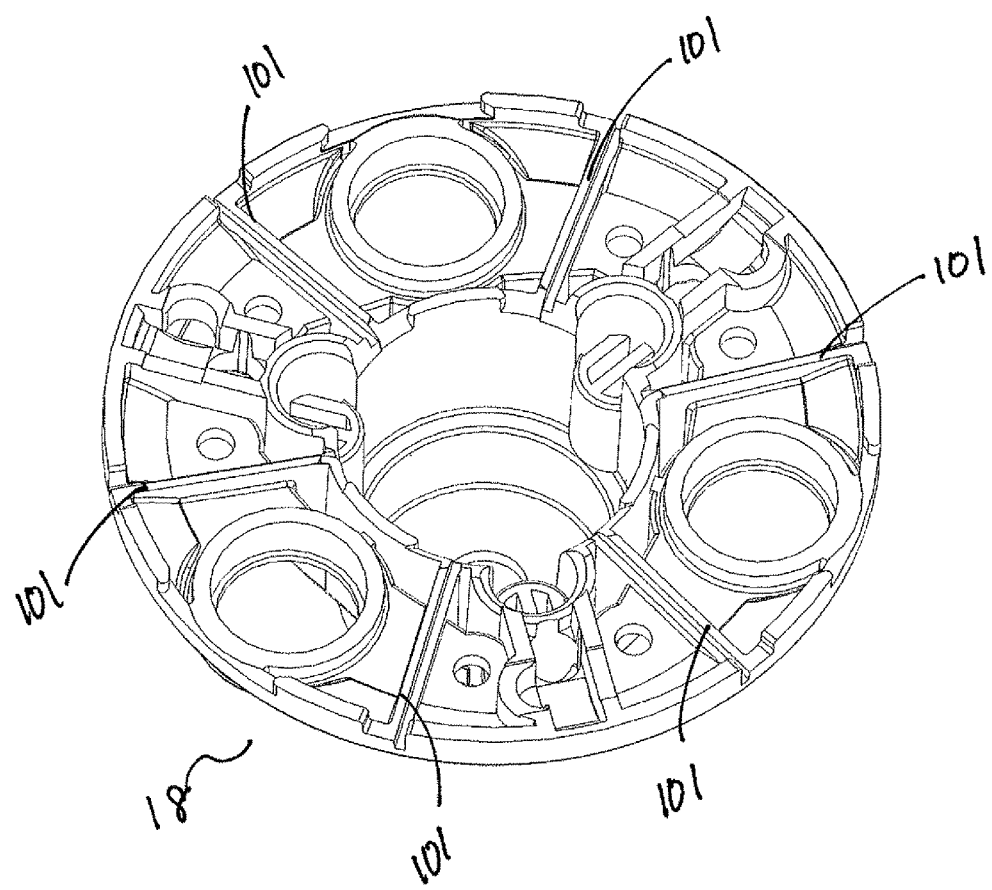
FIG. 7a shows an inside perspective view of the top cover of the trimmer head shown in FIG. 1.
Figure 7B:
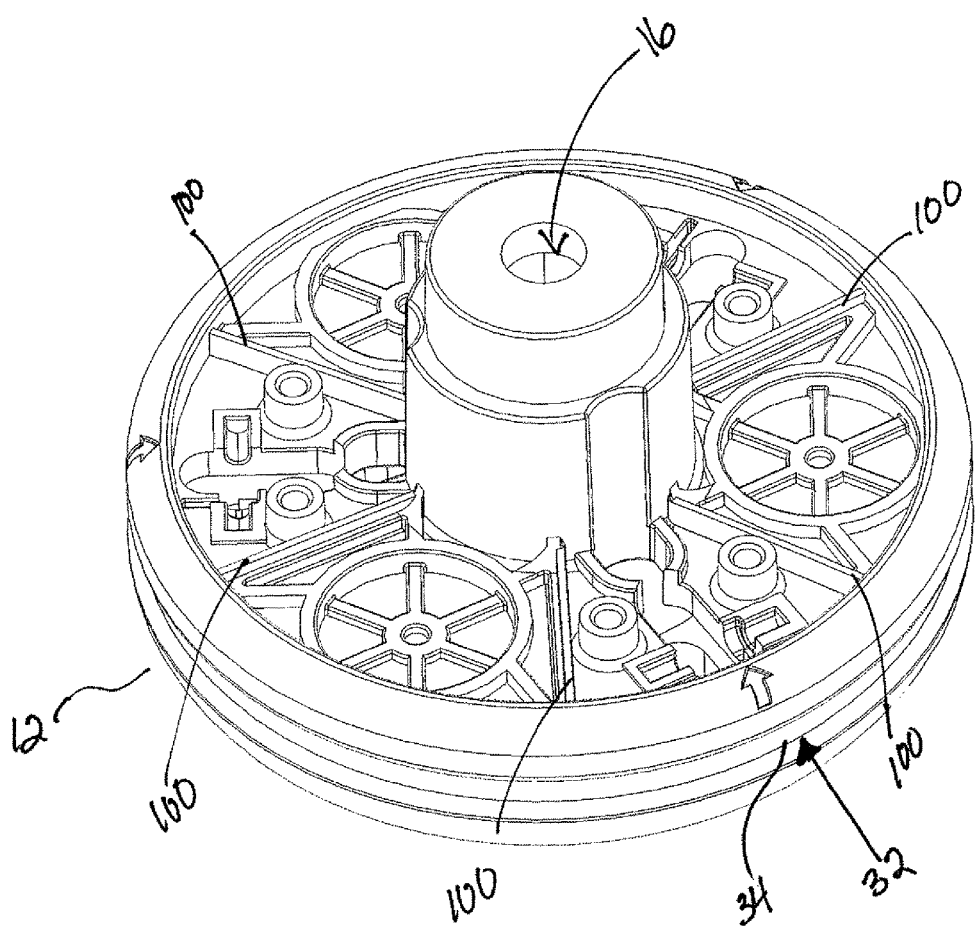
FIG. 7b shows an inside perspective view of the main housing of the trimmer head shown in FIG. 1.

FIGS. 7*a*, 7*b* and 8 depict the cover 18 and body portion 12 of trimmer head 10. Ribs 101 were added to cover 18 and corresponding ribs 100 were added to body portion 12. The number of ribs shown is six (6) but more or fewer ribs could be utilized provided the numbers corresponded between the cover 18 and the body portion 12. As shown in FIG. 8, ribs 100 and ribs 101 mate to create six chambers 103. Three of the chambers are sealed on the lower surface of trimmer head 13, and three of the chambers are sealed on the upper surface of trimmer head 14. Preferably, the sealing side of the chambers alternates between the upper surfaces and the lower surface, but other patterns are within the scope of the present invention. The flanges 21 of the three line holding mechanisms 20 are held in alternative chambers that are sealed on the lower surface 13, and the three blade holding mechanisms are associated with the remaining chambers that are sealed on the upper surface 14. It is preferable to have the line holding mechanisms 20 located in the chambers sealed on the lower surface to reduce debris contamination.

Passageway 102 allows for debris to be pushed out of the portion of the head containing the blade holding mechanism. There is one passageway for each portion (chamber) of the head having a blade holding mechanism 31. The user must first remove the blade 30 to access the passageway 102 as shown in FIG. 9. A piece of trimmer line, a small diameter stick, a small screwdriver or any small diameter rod-shaped object can be pushed through the passageway 102 to remove debris.

Preferably, the three blade holding mechanisms 31 are equally spaced 120 degrees apart and the three pivoting line holders 20 are also equally spaced 120 degrees apart. The line holding mechanisms 20 and blade holding mechanisms 31 are positioned in an alternating arrangement, each 60 degrees apart and equally spaced, as shown in FIGS. 11*a* and 12.

Variations to the invention are also within the scope of the present invention. For example, FIGS. 13-21 depict a second embodiment of the present invention wherein the trimmer head is not circular but has a tri-legged construction. The elements of the present invention work in the same manner as described above with the exception that there can only be three blades and three strips of trimmer line. In this embodiment, the line holding mechanisms 20 and the blade holding mechanisms 31 are aligned radially in pairs, each pair 120 degrees apart, as shown in FIGS. 20 and 21.

Additional variations of the invention include a trimmer head having two blade holding mechanisms and two line holding mechanisms. Alternatively, a head could have two blade holding mechanisms and four pivot posts, and so forth. It is not necessary that the number of line holding mechanisms be equal in number to the blade holding mechanisms. It is within the scope of the present invention to use between one (1) and four (4) of either the line holding mechanisms or the blade holding mechanisms and to use any number of the other. In certain circumstances when there is only a single line holding mechanism or a single blade holding mechanism, it may be necessary to include a counter balance to ensure proper rotation of the trimmer head without excessive vibration. More than four holding mechanisms could be used but the cost of manufacturing will increase similarly. It is also possible to change the shape of the head without departing from the intent of this invention, this could include triangular and so forth. Similarly, the cover 18 and body portion 12 could be different shapes (as shown in U.S. Pat. No. 8,069,758) provided they can be secured together.

When cutting light vegetation, the rotation of the head section 10 causes the line strips 15 to extend outward in a radial direction. The pivoting line holders 20 provide the advantage that if the line impacts an immovable object or very dense vegetation, the line holders can pivot away from the point of impact, relieving some of the stress of the impact. If the trimmer head 10 is held close to thick vegetation or an immovable object, the pivoting line holders 20 allow the line strips to rotate away from the point of impact such that the tips of each line strip 15 remains in a pivoted, withdrawn position. In this situation, a mid-section of the line will be in contact with the vegetation. However, because the mid-section is closer to the axis of rotation, its velocity is much slower than the line tip speed when the line is fully extended. The mid-section of the line is not damaged at this lower velocity.

One mode of operating the trimmer head 10 is to load the head with both line 15 and blades 30. The line is selected such that the tip of the line extends outward further than the tip of the blades, as shown in FIGS. 11a and 20. The blades are also heavier than the mass of the line. The weight of a typical strip of line is generally less than 0.1 grams whereas the weight of a nylon blade is over 6 grams. In such an arrangement, all six cutting elements can be rotated simultaneously. When encountering light vegetation, the tip of the line will trim the vegetation. The blades 30 will not touch the vegetation due to their shorter length. However, if heavier vegetation is encountered, the user can push the head closer to the vegetation. The strips of trimmer line will pivot such that their tips are no longer able to cut the vegetation. The shorter and heavier blades will then impact and sever the dense vegetation. This allows the user to selectively utilize the line 15 for cutting lighter vegetation or, if needed, utilize the blades 30 for cutting more dense vegetation without causing excessing wear on the line.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined by the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e. meaning "including, but not limited to") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A trimmer head for use with a rotary powered trimming device for cutting vegetation, said trimmer head comprising:
   a housing having a central opening for operable connection to a powered trimming device;
   at least three cutting blades pivotally connected to said housing via first pivotal connection mechanisms in a first plane;
   at least three strips of trimming line pivotally connected to said housing via second pivotal connection mechanisms in a second plane that is generally parallel to said first plane; and
   a series of chambers within the housing, wherein each of the first pivotal connection mechanisms is associated with a chamber of the series of chambers, wherein each chamber associated with one of the first pivotal connection mechanisms is in communication with a passageway, other than a passageway through which one of the least three cutting blades extends, extending through the housing;
   wherein each of the at least three cutting blades is capable of rotational movement about the first pivotal connection mechanisms within a lateral arc in said first plane of at least 180 degrees without striking said trimmer head or any of the at least three strips of trimming line and wherein each of the at least three strips of trimming line is capable of rotational movement within a lateral arc in said second plane of at least 180 degrees about the second pivotal connection mechanisms without striking said trimmer head or any of the at least three cutting blades;

wherein said cutting blades and said strips of trimming line are capable of use simultaneously to cut vegetation and also are capable of use separately to cut vegetation.

2. The trimmer head of claim 1, wherein said first pivotal connection mechanisms are aligned radially in said first plane with said second pivotal connection mechanisms located in said second plane.

3. The trimmer head of claim 1, wherein each of the first pivotal connection mechanisms are equally spaced from the adjacent first pivotal connection mechanisms and each of the second pivotal connection connecting mechanisms are equally spaced from the adjacent second pivotal connection mechanisms.

4. The trimmer head of claim 1, further comprising a means for removing debris from said trimmer head.

5. The trimmer head of claim 1, wherein each of the at least three cutting blades is capable of rotational movement within a lateral arc in said first plane of at least 200 degrees without striking said trimmer head or any of the at least three strips of trimming line and wherein each of the at least three strips of trimming line is capable of rotational movement within a lateral are in said second plane of at least 200 degrees without striking said trimmer head or any of the at least three cutting blades.

6. The trimmer head of claim 1, wherein each of the at least three cutting blades is capable of rotational movement within a lateral arc in said first plane of approximately 220 degrees without striking said trimmer head or any of the at least three strips of trimming line and wherein each of the at least three strips of trimming line is capable of rotational movement within a lateral arc in said second plane of at least approximately 240 degrees without striking said trimmer head or any of the at least three cutting blades.

7. A trimmer head for use with a rotary powered trimming device for cutting vegetation, said trimmer head comprising:
 a housing having a central opening for operable connection to a powered trimming device, the housing comprising a cover and a body portion;
 a series of three first mechanisms equally spaced apart pivotally connecting three cutting blades to said housing in a first plane;
 a series of three second mechanisms equally spaced apart pivotally connecting three strips of trimming line to said housing in a second plane that is generally parallel to said first plane, each of said three second mechanisms radially aligned with each of said three first mechanisms; and
 a series of chambers within the housing, wherein each of the first mechanisms and the second mechanisms is associated with one chamber of the series of chambers, each chamber being defined by a volume formed between a set of ribs extending from the cover and the body portion;
 wherein each of the cutting blades in said series of three cutting blades is capable of rotational movement within a lateral arc in said first plane of at least 180 degrees about the first mechanism without striking said trimmer head or any of the series of three strips of trimming line and wherein each of the strips of trimming line in said series of three strips of trimming line is capable of rotational movement within a lateral arc in said second plane of at least 180 degrees about the second mechanism without striking said trimmer head or any of the series of three cutting blades;
 wherein said series of cutting blades and said series of strips of trimming line are capable of use simultaneously to cut vegetation and also are capable of use separately to cut vegetation.

8. The trimmer head of claim 7, wherein each of the cutting blades in said series of three cutting blades is capable of rotational movement within a lateral arc in said first plane of approximately 220 degrees without striking said trimmer head or any of the series of three strips of trimming line and wherein each of the strips of trimming line in said series of three strips of trimming line is capable of rotational movement within a lateral arc in said second plane of at least approximately 240 degrees without striking said trimmer head or any of the series of three cutting blades.

9. The trimmer head of claim 7, wherein each of the blade connecting mechanisms are equally spaced from the adjacent blade connecting mechanisms and each of the trimming line connecting mechanisms are equally spaced from the adjacent trimming line connecting mechanisms.

10. The trimmer head of claim 7, further comprising a means for removing debris from said trimmer head.

11. The trimmer head of claim 7, wherein each of the cutting blades in said series of three cutting blades is capable of rotational movement within a lateral arc in said first plane of at least 200 degrees without striking said trimmer head or any of the series of three strips of trimming line and wherein each of the strips of trimming line in said series of three strips of trimming line is capable of rotational movement within a lateral are in said second plane of at least 200 degrees without striking said trimmer head or any of the series of three cutting blades.

12. The trimmer head of claim 7, wherein each of the cutting blades in said series of three cutting blades is capable of rotational movement within a lateral arc in said first plane of approximately 220 degrees without striking said trimmer head or any of the series of three strips of trimming line and wherein each of the strips of trimming line in said series of three strips of trimming line is capable of rotational movement within a lateral arc in said second plane of at least approximately 240 degrees without striking said trimmer head or any of the series of three cutting blades.

13. A trimmer head for use with a rotary powered trimming device for cutting vegetation, said trimmer head comprising:
 a housing having a central opening for operable connection to a powered trimming device;
 one or more blade connecting mechanisms, each blade connecting mechanism pivotally connecting a cutting blade to said housing in a first plane;
 one or more line connecting mechanisms, each line connecting mechanism pivotally connecting a strip of trimming line to said housing in a second plane that is generally parallel to said first plane; and
 a series of chambers within the housing, wherein each of the one or more blade connection mechanisms is associated with a chamber of the series of chambers, wherein each chamber associated with the one or more blade connection mechanisms is in communication with a passageway, other than a passageway through which one of the cutting blades extends, extending through the housing;
 wherein each of the cutting blades is capable of rotational movement within a lateral arc in said first plane of at least 180 degrees about the blade connecting mechanism without striking said trimmer head or any of the strips of trimming line and wherein each of the strips of trimming line is capable of rotational movement within a lateral arc in said second plane of at least 180 degrees about the line connecting mechanism without striking said trimmer head or any of the cutting blades;

wherein said cutting blades and said strips of trimming line are capable of use simultaneously to cut vegetation and also are capable of use separately to cut vegetation.

14. The trimmer head of claim 13, wherein said blade connecting mechanisms are aligned radially in said first plane with said trimming line connecting mechanisms located in said second plane.

15. The trimmer head of claim 13, wherein each of the blade connecting mechanisms are equally spaced from the adjacent blade connecting mechanisms and each of the trimming line connecting mechanisms are equally spaced from the adjacent trimming line connecting mechanisms.

16. The trimmer head of claim 13, further comprising a means for removing debris from said trimmer head.

17. The trimmer head of claim 13, wherein each of the cutting blades is capable of rotational movement within a lateral arc in said first plane of at least 200 degrees without striking said trimmer head or any of the strips of trimming line and wherein each of the strips of trimming line is capable of rotational movement within a lateral arc in said second plane of at least 200 degrees without striking said trimmer head or any of the cutting blades.

18. The trimmer head of claim 13, wherein each of the cutting blades is capable of rotational movement within a lateral arc in said first plane of at least 220 degrees without striking said trimmer head or any of the strips of trimming line and wherein each of the strips of trimming line is capable of rotational movement within a lateral arc in said second plane of at least 240 degrees without striking said trimmer head or any of the cutting blades.

* * * * *

UNITED STATES PATENT AND TRADEMARK OFFICE
CERTIFICATE OF CORRECTION

PATENT NO. : 10,278,327 B2
APPLICATION NO. : 14/707884
DATED : May 7, 2019
INVENTOR(S) : David B. Skinner and James A. Bennett Page 1 of 1

It is certified that error appears in the above-identified patent and that said Letters Patent is hereby corrected as shown below:

On the Title Page

Between items (65) and (51), insert:
--Related U.S. Application Data
(60) Provisional application No. 61/990,769, filed on May 9, 2014.--

Signed and Sealed this
Fourth Day of February, 2020

Andrei Iancu
*Director of the United States Patent and Trademark Office*